United States Patent Office 3,181,415
Patented May 4, 1965

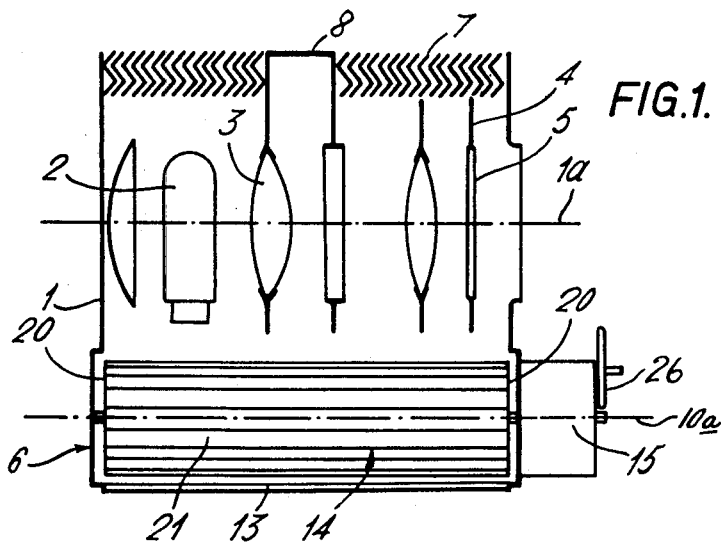

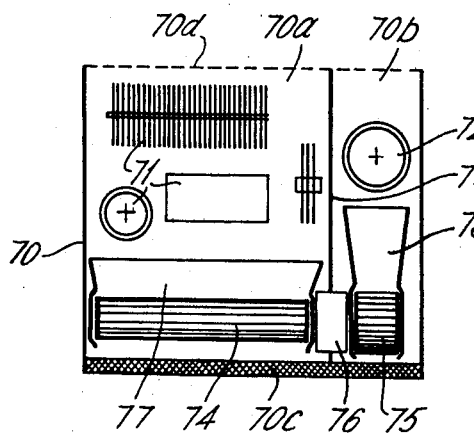
FIG. 7.
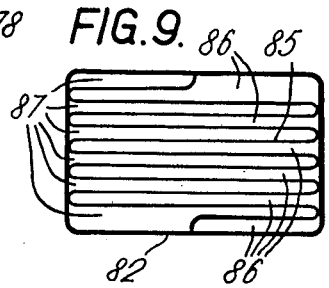
FIG. 9.
FIG. 6.
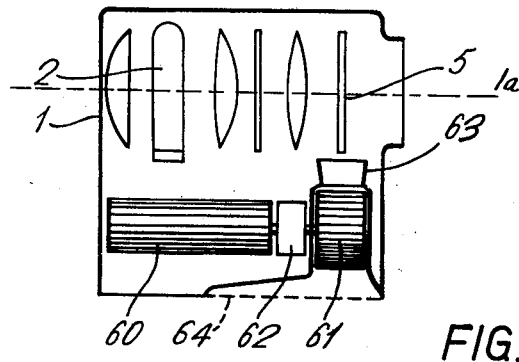
FIG. 8.
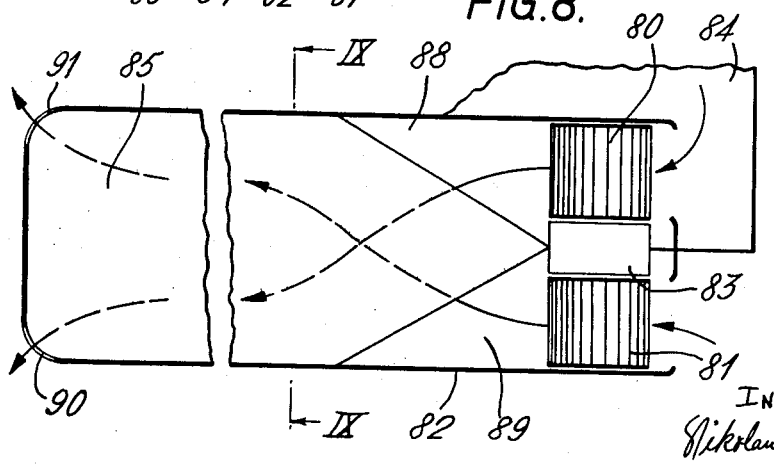

3,181,415
COOLING ARRANGEMENTS FOR PROJECTORS AND OTHER APPARATUS EMITTING WASTE HEAT IN OPERATION
Nikolaus Laing, Stuttgart, Germany, assignor, by mesne assignments, to Laing Vortex, Inc., New York, N.Y.
Filed Apr. 24, 1961, Ser. No. 105,056
Claims priority, application Germany, Apr. 23, 1960, L 35,985
4 Claims. (Cl. 88—24)

This invention relates to the cooling of apparatus providing an enclosure wherein is located at least one object which gives off waste heat in operation. One important example of such apparatus is a lantern slide projector, wherein, in all but the smallest sizes, the lamp and various optical devices must be cooled by some form of power operated ventilating means. Another example of such apparatus is an electronic device including one or more electron tubes giving off heat in operation.

In the past apparatus such as above referred to has commonly been cooled by means of small axial-flow fans. This form of cooling has the drawback that while the cross-section of the air flow produced by an axial fan is circular, the enclosure will commonly be rectangular: this leads to a waste of the cooling air. To produce the necessary dynamic pressure the tip speeds of the fan must be so high as to generate appreciable noise.

The object of the invention is to provide an improved form of apparatus such as above mentioned.

Accordingly the invention provides apparatus including an enclosure, one or more objects within the enclosure which give off waste heat in operation, and ventilating means associated with the enclosure to drive a stream of cooling air therethrough to remove the waste heat, said ventilating means including at least one cylindrical bladed rotor mounted for rotation about its axis, a motor to drive the rotor, and means to guide said stream twice through the blades of the rotor in a direction always transverse to the rotor axis.

It will be seen that the cross-section of the air flow produced by the rotor is rectangular, which simplifies design of the apparatus and reduces waste of cooling air. Thus in a lantern slide projector the rotor can be mounted at the bottom of the enclosure with its rotor (or rotors) extending substantially the length thereof parallel to the optic axis.

Various preferred features of the ventilating means will be described later. With these features the ventilating means can be highly efficient and the rotor relatively small: this secures among other advantages a very low noise level.

The invention will be further described with reference to the accompanying diagrammatic drawings showing various embodiments of the invention by way of example.

In the drawings,

FIGURES 1 and 2 are respectively an axial and a transverse section of a lantern slide projector according to the invention;

FIGURE 5 is a transverse section of a modified form of the projector of FIGURES 1 and 2;

FIGURE 6 is an axial section of a further modified form of the projector of FIGURES 1 and 2;

FIGURE 7 is an axial section of electronic apparatus according to the invention, and FIGURES 8 and 9 are respectively a diagrammatic sectional plan and vertical section of a heat exchanger and blower combination.

Figure 3:
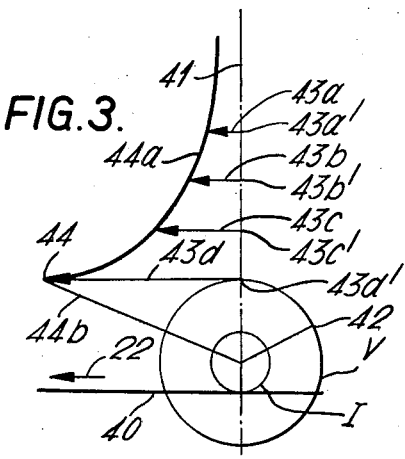
FIGURES 3 and 4 are diagrams illustrating flow conditions in ventilating means forming part of the projector of FIGURES 1 and 2.

Referring to FIGURES 1 and 2 of the drawings, the lantern slide projector there shown comprises a casing 1 which is rectangular in sectional plan and also, except for its lower part, in transverse section. Along a horizontal central optic axis 1a in the upper part of the casing 1 are mounted a lamp 2, an optical heat filter 3 and a slide mount 4 adapted to carry a slide at 5, as well as other optical elements: the optical system of the projector, as such, forms no part of the present invention.

Ventilating means in the form of a blower designated generally 6 are provided at the lower part of the projector to drive a stream of cooling air upwardly through the casing 1 past the optical elements 2, 3, 4, 5 and others and out of the casing at the top through transverse louvres 7. The louvres 7 have the form of strips (e.g. of sheet metal) bent twice along their length and are sufficiently closely spaced to avoid escape of light, while providing ample passage for cooling air. Midway in its length the top of the housing is closed by a plate 8, which has the effect of intensifying the air streams in the region of the lamp 2 and slide mount 4 and slide 5 which chiefly require cooling.

The lower part of the casing 1, as seen in FIGURE 2, has its opposite side walls 10, 11 converging downwardly somewhat and bent out more or less horizontally to one side to provide first and second guide walls 12, 13 at opposite sides of a cylindrical rotor 14 extending the length of the casing 1 parallel to the optic axis 1a and driven by an electric motor 15 mounted on the outside of the casing; the walls 12, 13 define an air inlet 16 across which is located a grid 17 to prevent an operator's hands from coming into contact with the rotor 14. The rotor comprises end discs 20 between which are mounted parallel to the axis a series of blades 21 which are curved as seen in transverse section so as to be concave facing the direction of rotation, indicated by the arrow 22, with their outer edges 23 leading their inner edges 24. The first guide wall 12, going from the inlet 16, is at first well spaced from the rotor 14 so as to have little effect on flow therethrough. Intermediate in its width the wall 12 is bent sharply towards the rotor, whereafter follows a wall portion 12a which is concave to the rotor and converges therewith in the direction of rotation up to the line (designated 12b) of nearest approach to the rotor. Remote from the rotor the wall 12 joins the descending side wall 10 of the casing in a rounded reverse bend 12c. The second guide wall 13, going from the inlet 16, is well spaced from the rotor 14 until at 13a it is bent sharply towards the rotor, whereafter it diverges with steadily increasing radius of curvature to merge with the descending side wall 11 of the casing. The line of nearest approach of the wall 13 to the rotor 14, at 13a, is opposite the corresponding line of the wall 12 and is spaced from the rotor by more than a working clearance.

The rotor 14 and guide walls 12, 13 form the blower previously mentioned and designated 6: in operation of this blower a vortex approximating to a Rankine vortex is set up the core of which is eccentric to the rotor axis and indicated by the flow lines shown chain-dotted at V: the whole throughput flows twice through the rotor blades 21 from the inlet 16 to the pressure zone 25 in a direction always perpendicular to the rotor axis 10a as indicated in general direction only by the chain dotted flow lines F, MF.

FIGURE 3 shows an ideal relation of the vortex to the rotor 14, and the distribution of velocity in the vortex. The line 40 represents a small part of the inner envelope of the rotor blades 21, projected on to a straight line, while the chain dotted line 41 represents a radius of the rotor taken through the axis 42 of the vortex core V. Velocity of fluid at points on the line 41 by reason of the vortex is indicated by the horizontal lines 43a, 43b etc., the length of each line 43a, 43b etc. being a measure of the velocity at the point 43a', 43b' etc. respectively. The envelope of these lines is shown by the curve 44, which has two portions, one 44a approximately a rectangular hyperbola and the other, 44b a straight line. The curve 44a relates to the field region of the vortex and the curve 44b to the core: it will be understood that the curves are those of an ideal or "mathematical" Rankine vortex and actual flow conditions will only approximate to these curves.

The core V of the vortex is a whirling mass of air with no translational movement as a whole, and velocity diminishes going from the periphery of the core to its axis 42. The core V intersects the inner blade envelope indicated at 40 and an isotach I osculates the envelope, in the manner of a gear wheel meshing with an internal gear ring. The vortex core V is a region of low pressure, and the location of the core can be discovered by investigation of pressure distribution within the rotor. Although for convenience the vortex core V has been shown circular and has been regarded as possessing an axis, the core will usually not be truly circular.

The velocity profile of the fluid at the second entrance thereof to the rotor blades 21 will be that of the vortex. In the ideal case of FIGURE 3 this profile will be that of the Rankine vortex there shown by curves 44a, 44b; in an actual case the profile will have the general character of a Rankine vortex. Thus there will be in the region of the periphery of the core V a flow tube of high velocity indicated at MF in FIGURE 2 by the heavier chain dots while the flow tubes remote from the periphery of the core will have a very much smaller velocity. It will be appreciated that much the greater amount of air flow in the flow tubes in the region of maximum velocity.

Figure 4:
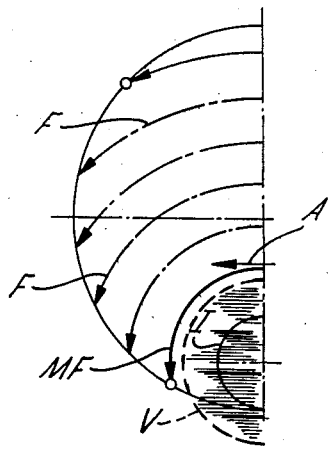

FIGURE 4 illustrates in an idealized manner a number of flow tubes F under the influence of a Rankine vortex. The core region is shown shaded, and the maximum velocity flow tube MF undergoes a change of direction of about 180° in passing through the interior of the rotor. Including the traversals of the blades the change of direction will then exceed 180°. It is particularly to be noted that the major part of the throughput (represented by the flow tube MF) passes through the rotor blades 21 where they have a component of velocity in a direction opposite to the main direction of flow within the rotor indicated in FIGURE 4 by the arrow A.

It is considered that the blade angles and blade curvature determine the character of the vortex while the position of the vortex core is determined by means of the guide body provided in the construction of FIGURES 1 and 2 by the wall part 12a. It is considered that in a given case the particular blade angles and blade curvature depend on the following parameters among others: the diameter of the blades, the depth of a blade in radial direction, the density and viscosity of the fluid, the dispositions of the external guide body, the rotational speed of the rotor, as well as on the ratio between overall pressure and back pressure. These parameters must be adapted to correspond to the operating conditions ruling in a given case; to obtain the best results by means of a vortex as just described requires in any given case the adoption of quite definite blade angles and curvature. (Blade curvature is in this connection to be understood to mean not only the curvature of a blade of uniform thickness, but also the curvatures of the contours of profiled blades.) Whether or not the angles and curvatures have been fixed at optimum values is to be judged by the criterion that the flow tubes close to the vortex core should be deflected by approximately 180°. The creation of a vortex such as discussed above leads to a greatly increased efficiency at low Reynolds members; for an explanation of this the specification of British Patent No. 876,611 is referred to. This specification also gives further information about the construction and operation of blowers on the lines of that shown at 6 in FIGURES 1 and 2.

Of course in a particular construction other considerations may cause a designer to deviate from what considered purely from the point of view of flow is the optimum. Indeed the flow lines in a particular case will probably not correspond entirely as to the position of the vortex core V with the idealized views of FIGURES 3 and 4. Thus the latter figure shows that it is desirable to have the axis of the core V within the inner blade envelope so that the isotach I within the core osculates that envelope; however, this is not essential and is not the case in the construction of FIGURES 1 and 2.

It will nevertheless be seen that despite divergences of the flow conditions of FIGURES 1 and 2 from the ideal, the maximum velocity flow tube MF with which is associated the major part of the throughput is turned through an angle well over 90° in passing from suction to pressure region and that it passes through the rotor blades where these have a velocity with a component opposite to the main direction of flow through the rotor, indicated by the arrow A.

The upward divergence of the casing walls 10, 11 will be seen to produce a diffuser effect upon the cooling air stream. Gears indicated schematically at 26 may be driven by the motor to operate slide-changing mechanism not shown.

FIGURE 5 shows a modification of the construction of FIGURES 1 and 2 wherein the casing 1 is surrounded, at least over its side walls 10, 11, by an outer casing 50: apart from this change and certain dimensional changes in the lower part of the casing 1, the construction is as described with reference to FIGURES 1 and 2 and the blower 6 operates as described with reference to FIGURES 3 and 4. Air passing to the inlet 16 of the casing 1 passes downwards in the channels 51 formed between the casings 1 and 50. This air cools the casing 50 and prevents it from getting too hot to touch with comfort.

In the projector of FIGURE 6, the single rotor 14 of FIGURES 1 and 2 is replaced by two rotors, a long one 60 of smaller diameter and a short one 61 of larger diameter both mounted on the same axis parallel to the optic axis 1a and driven by a motor 62 mounted between them. The two rotors 60, 61 extend over most, though not quite all, of the length of the casing 1 and together produce an upward stream of cooling air past the optical elements as in FIGURES 1 and 2. However, the stream produced by the rotor 61 is stronger because of its larger diameter, and is directed against the slide 5, which needs most cooling. The rotor 61 is associated with a diffuser 63 at its outlet which increases pressure to enable the air to be drawn through a filter 64 located at the inlet. The lower part of the casing 1 is modified to adapt it to the rotors 60, 61: these rotors each operate on the principles set forth with reference to FIGURES 3 and 4 and apart from the modifications noted the projector of FIGURE 6 is as that of FIGURES 1 and 2.

FIGURE 7 shows a casing 70 which is rectangular in horizontal and transverse section and within which are mounted a series of electrical or electronic elements 71 including a magnetron valve 72 separated from the other elements by a transverse partition 73 which divides the casing into two chambers 70a, 70b. The bottom of the casing 70 is formed by a filter 70c, and the top by a close-mesh grid 70d.

A composite blower is provided in the lower part of the casing and includes a pair of rotors 74, 75 mounted coaxially and driven by a common motor 76 placed between them. The rotor 74 extends over the greater part of the length of the chamber 70a and the rotor 75 extends over the greater part of the length of the chamber 70b, and each rotor is associated with guide walls (not shown) as described with reference to FIGS. 1 and 2. Flow through each rotor takes place as described with reference to FIGS. 3 and 4. The rotors 74, 75 are each associated with a diffuser 77, 78 respectively. The rotor 75 is larger than the rotor 74 and produces a higher pressure and a stronger cooling stream past the valve 72, which requires more cooling than the other elements 71: the partition 73 confines this higher pressure to the chamber 70b. The elements 71 are cooled by the stream of cooling air produced by the rotor 74.

Constructions according to the invention are envisaged where the blower output can be throttled; the blower described with reference to FIGS. 1 to 4 is particularly suitable for this, as is explained in British Patent No. 876,611 above referred to. Various arrangements for adjustable throttling are described in that application.

Lantern slides or other light projectors according to the invention may be designed so that the blades of the rotor prevent light from emerging from the enclosure. The blowers described are capable of producing greater pressure than the simple axial-flow fans hitherto used, and consequently light-obscuring baffles at entry or exit of the cooling air stream can be made more effective even if this sets up a back pressure. Finally it has been found sufficient to have only a low blade speed; this much reduces the noise.

The form of blower illustrated in FIGS. 1 to 4 can be replaced by one wherein the guide means comprise one or more guide bodies within the rotor and extending the length thereof, the rotor itself remaining in the form shown. One advantageous form of blower with interior guide bodies is described in British Patent No. 876,612.

I claim:

1. A light projector comprising a casing defining sides and ends of a vertical rectangular section air duct having an inlet in the lower part of the casing and an outlet at the top of the casing said inlet and said outlet extending over the major part of the length of the casing, a plurality of optical elements within the casing and arranged along an axis extending horizontally parallel to the sides of the casing said optical elements including a lamp and means to concentrate light therefrom along said axis, cylindrical bladed rotor means mounted in the lower part of the casing adjacent said inlet for rotation about an axis parallel to the optical axis, said rotor means extending the greater part of the length of the casing, and the sides of said casing adjacent the rotor means being shaped to provide guide walls cooperating with the rotor means on rotation thereof to guide air from the inlet transversely to the axis of the rotor means through the path of the rotating blades into the interior of the rotor and thence again through the path of the rotating blades in a generally upward direction into said duct.

2. A light projector as claimed in claim 1, including outer walls spaced from said casing and defining therewith air passages leading down to said inlet from the top of the casing and extending over the length of said sides.

3. A light projector comprising a casing defining sides and ends of a vertical rectangular section air duct having an inlet in the lower part of the casing and an outlet in an upper part of the casing said inlet and outlet extending over the major part of the length of the casing, a plurality of optical elements within the casing and arranged along an axis extending horizontally parallel to the sides of the casing said optical elements including a lamp and means to concentrate light therefrom along said axis, cylindrical bladed rotor means mounted below said optical elements for rotation about an axis parallel to the optical axis, said rotor means extending the greater part of the length of the casing and guide means extending adjacent the rotor means, the guide means and rotor means cooperating on rotation of the latter to guide air from the inlet transversely to the axis of the rotor means through the path of the rotating blades into the interior of the rotor and thence again through the path of the rotating blades in a generally upward direction into said duct.

4. A light projector as claimed in claim 3, wherein the rotor means includes a pair of rotors aligned on a common axis and driven by a common motor, one rotor being of greater diameter than the other.

References Cited in the file of this patent

UNITED STATES PATENTS

| | | |
|---|---|---|
| 2,135,996 | Wood | Nov. 8, 1938 |
| 2,160,890 | Mulch | June 6, 1939 |
| 2,186,618 | Philips | Jan. 9, 1940 |
| 2,431,520 | Streich | Nov. 20, 1947 |
| 2,452,646 | Frankel | Nov. 2, 1948 |
| 2,755,072 | Kreuttner | July 17, 1956 |
| 2,773,676 | Boyle et al. | Dec. 11, 1956 |
| 2,942,773 | Eck | June 28, 1960 |
| 2,968,436 | Coester | Jan. 17, 1961 |
| 2,979,986 | Miller | Apr. 18, 1961 |

FOREIGN PATENTS

| | | |
|---|---|---|
| 291,007 | Great Britain | Aug. 2, 1928 |